United States Patent Office 3,174,707
Patented Mar. 23, 1965

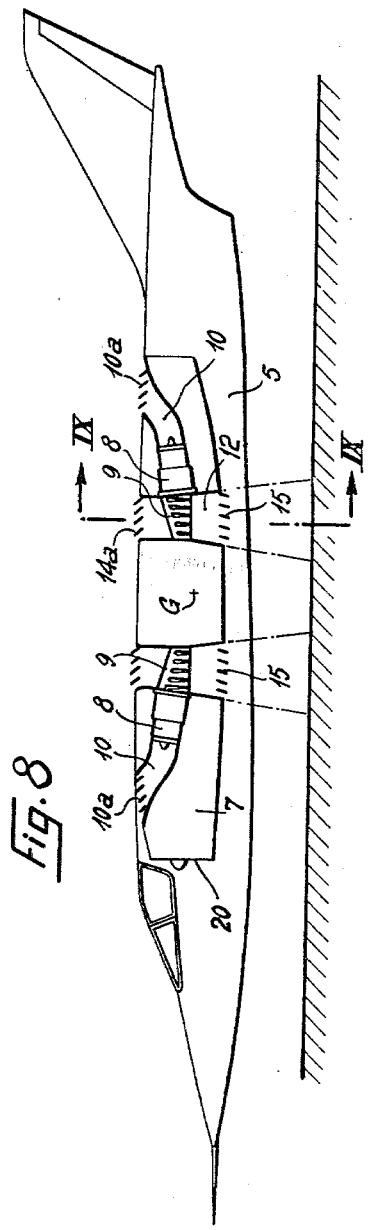
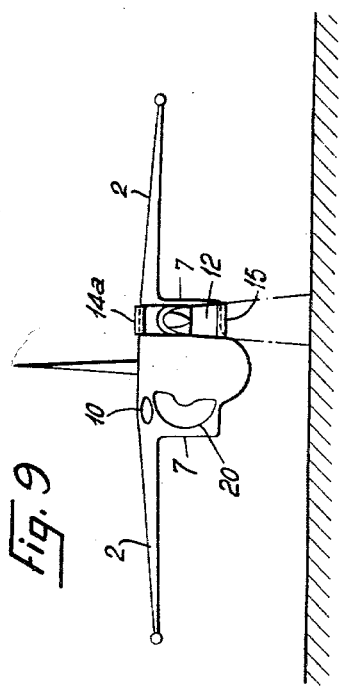
Fig. 8
Fig. 9

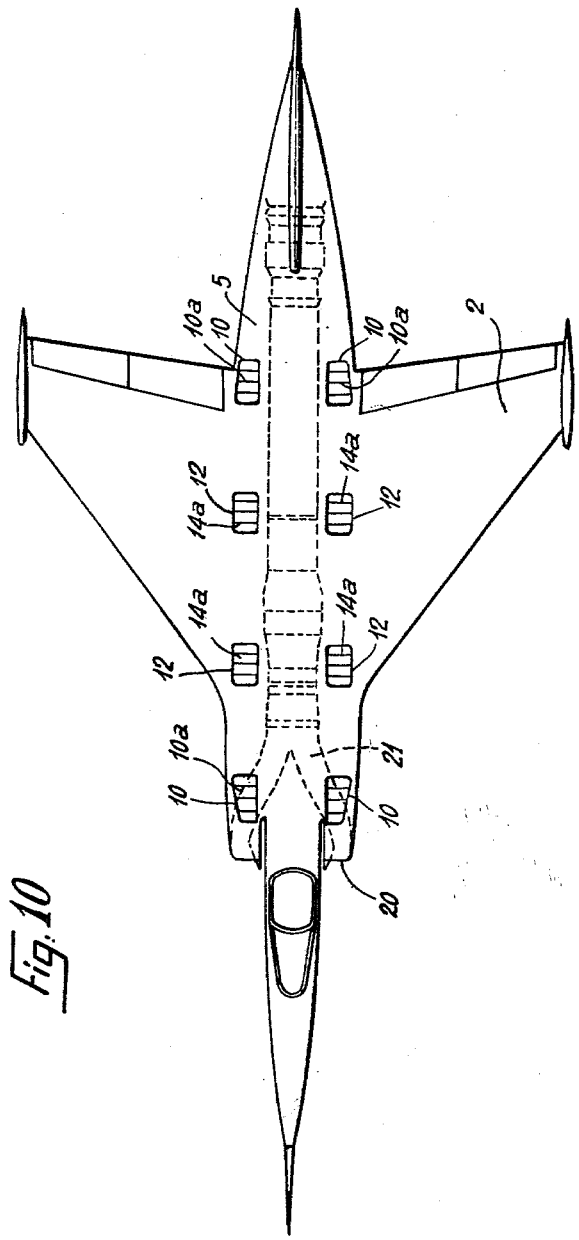

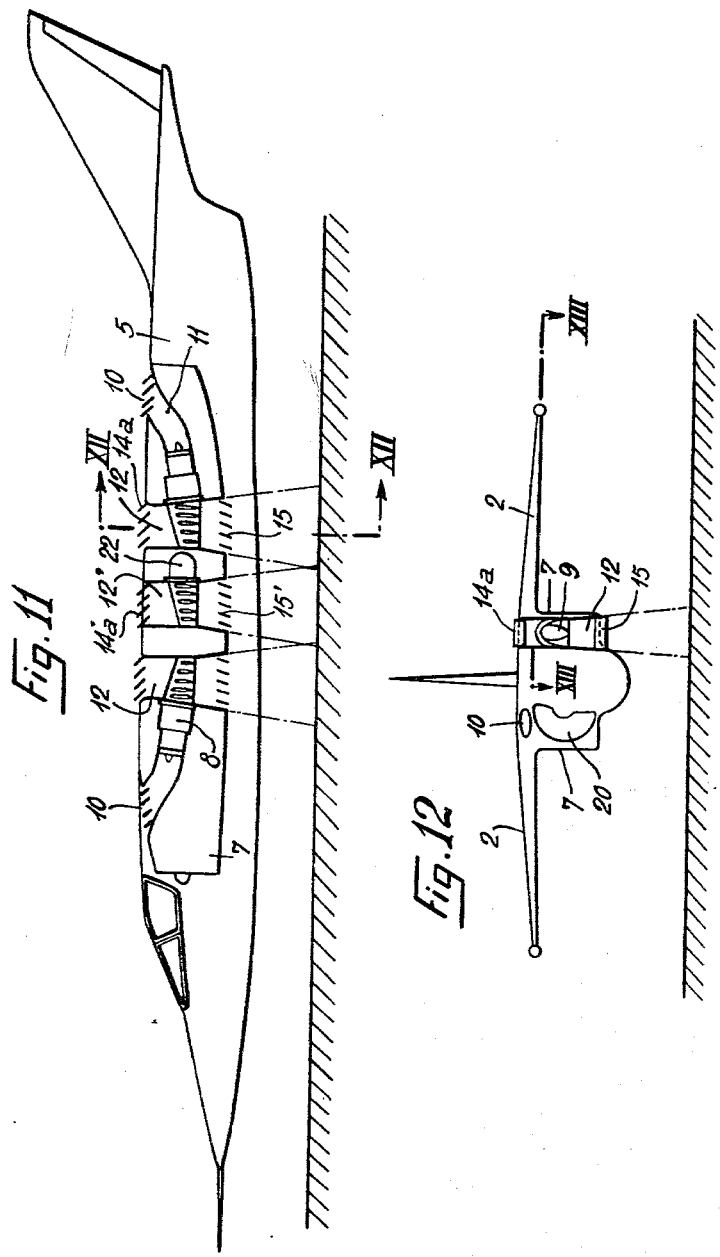

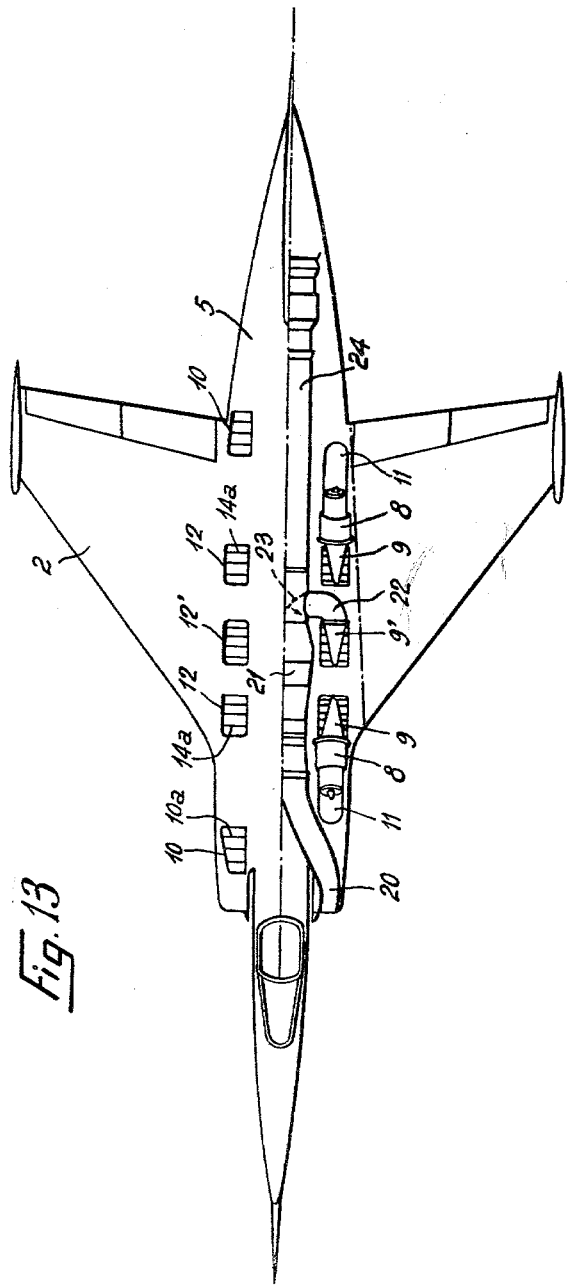

3,174,707
SHORT OR VERTICAL TAKE-OFF AND
LANDING AIRCRAFT
Armand G. Ricard, Viroflay, France, assignor to Societe Anonyme des Ateliers d'Aviation Louis Breguet and Societe Bertin & Cie, both of Paris, France, both companies of France
Filed Jan. 9, 1963, Ser. No. 250,291
Claims priority, application France, Jan. 13, 1962, 884,758
10 Claims. (Cl. 244—12)

It is known that it is possible to use engines such as jet engines whose thrust can be directed substantially in a vertical direction so that the said thrust balances all or part of the weight of an aircraft, in order to permit this aircraft to take off and land with a very reduced or zero run.

These jet engines may be either specially designed and used for producing this lifting thrust or one or more jet engines which are normally used for propulsion but whose flow can be deflected substantially into a vertical direction in accordance with known methods.

It is also known that the thrust of such jet engines can be increased by using an ejector device for drawing fresh air into the flow of hot gases produced by this jet engine.

The present invention is concerned with an aircraft for taking off and landing vertically or with a short run which is equipped with such jet engines, and in order to simplify the description jet engines of this kind will be referred to hereinafter by the expression "ejector-equipped jet engines."

In order to construct an aircraft for short-run or vertical take-off and landing, arrangements must be made to ensure that the thrust of the lifting means have a resultant which passes near to the centre of gravity of the aircraft, in order to permit easy compensation of the moment of this resultant relatively to the centre of gravity. The useful volumes of the aircraft must be retained, more especially the fuselage reserved for the crew, the freight, passengers, special accommodation, sometimes a central propulsion jet engine. The lifting means must also be arranged symmetrically with respect to the centre of gravity of the aircraft.

Now, ejector-equipped jet engines consume a very considerable quantity of air and the supplying of air to these engines, and also the discharge of the air-gas mixture, present serious problems of installation.

The invention makes it possible to solve these problems, taking into account the foregoing considerations, by means of the combination of ejector-equipped jet engines, with cowlings which are arranged externally of the useful volumes of the aircraft and are adapted to ensure the supply of air to the said ejector-equipped jet engines and also the discharge of the mixture of gas and inducted air under satisfactory conditions.

These cowlings, with their ejector-equipped jet engines, are arranged symmetrically with respect to the centre of gravity of the aircraft. They may advantageously be constructed by enlarging and suitably arranging cowlings already existing on the aircraft, for example cowlings accommodating landing gear, cowlings connecting the wings to the fuselage etc. In this way not only are the useful volumes of the aircraft not encroached upon, but in addition the resistance to forward movement is reduced without complicating the supporting structure of the aircraft.

This arrangement in cowlings has the advantage of not prejudicing the structure of the aircraft for the arrangement of the necessary ducts required by the inspiration of fresh air. Furthermore, the spacing of the jet engines on either side of the fuselage promotes the interaction of the ground effect on the fuselage, the lower portion of which does not have any aperture therein.

Over and above this, the use of ejector-equipped jet engines as lifting means has the advantage that the discharged gases have a low speed and a considerably diminished temperature which reduces the erosion effects on the ground, reduces noise and permits of mounting devices for selectively directing the flow of ejected gases under conditions which are very favourable to their construction and operation.

The invention is illustrated by way of example in the accompanying drawings, in which:

FIGURE 8 is a diagrammatic view in elevation, partly in section, of an aircraft wherein ejector-equipped jet engines are combined with cowlings connecting the wings to the fuselage.

FIGURE 9 is a front view with a half-section on IX—IX of FIGURE 8.

FIGURE 10 is a plan view corresponding to the two preceding views.

FIGURE 11 is a diagrammatic view in elevation and partly in section of a modified form of an aircraft with lifting means combined with cowlings which connect the wings to the fuselage.

FIGURE 12 is a front view half in section on the line XII—XII of FIGURE 11.

FIGURE 13 is a plan view half of which is in section on the line XIII—XIII of FIGURE 12.

Figure 1:
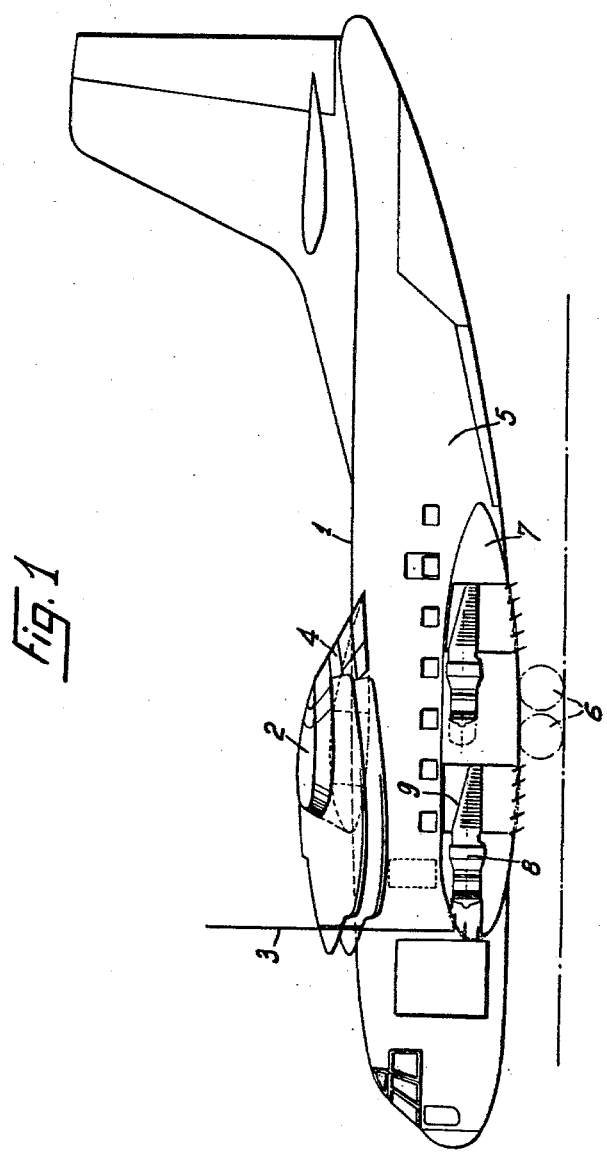
FIGURE 1 is an elevational view, partly in section, of an aircraft wherein the lifting jet engines are combined with landing gear cowlings.
Figure 2:
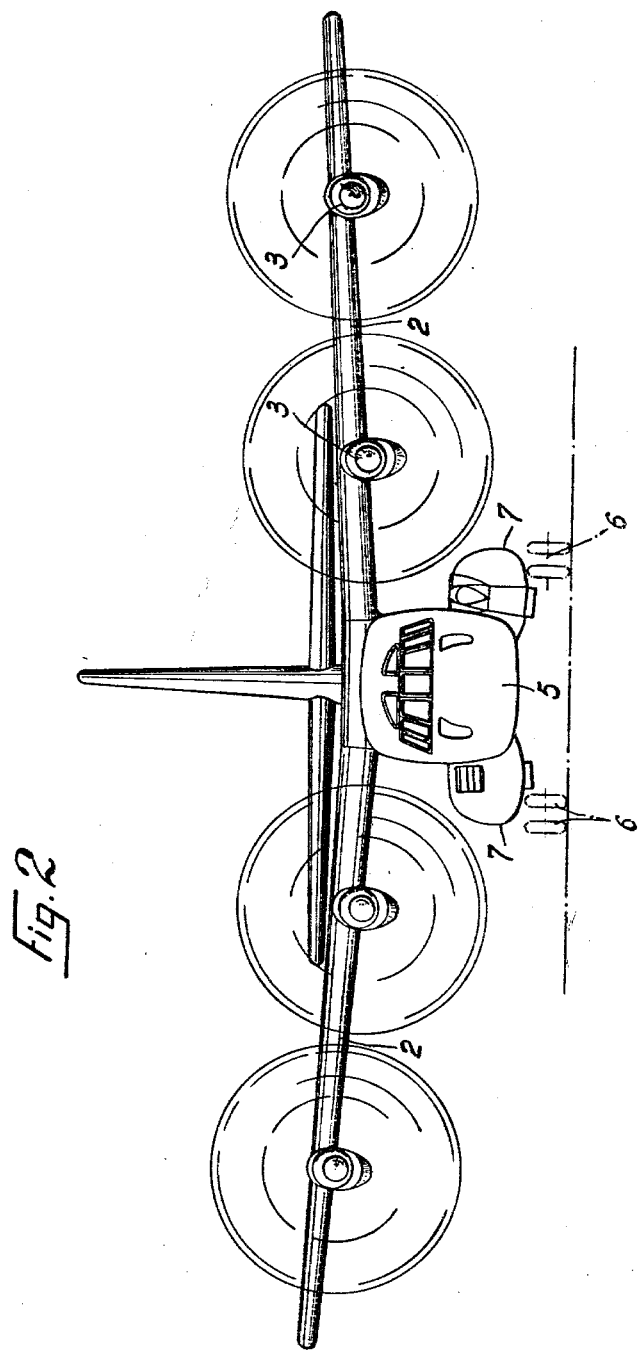
FIGURE 2 is a corresponding front view.
Figure 3:
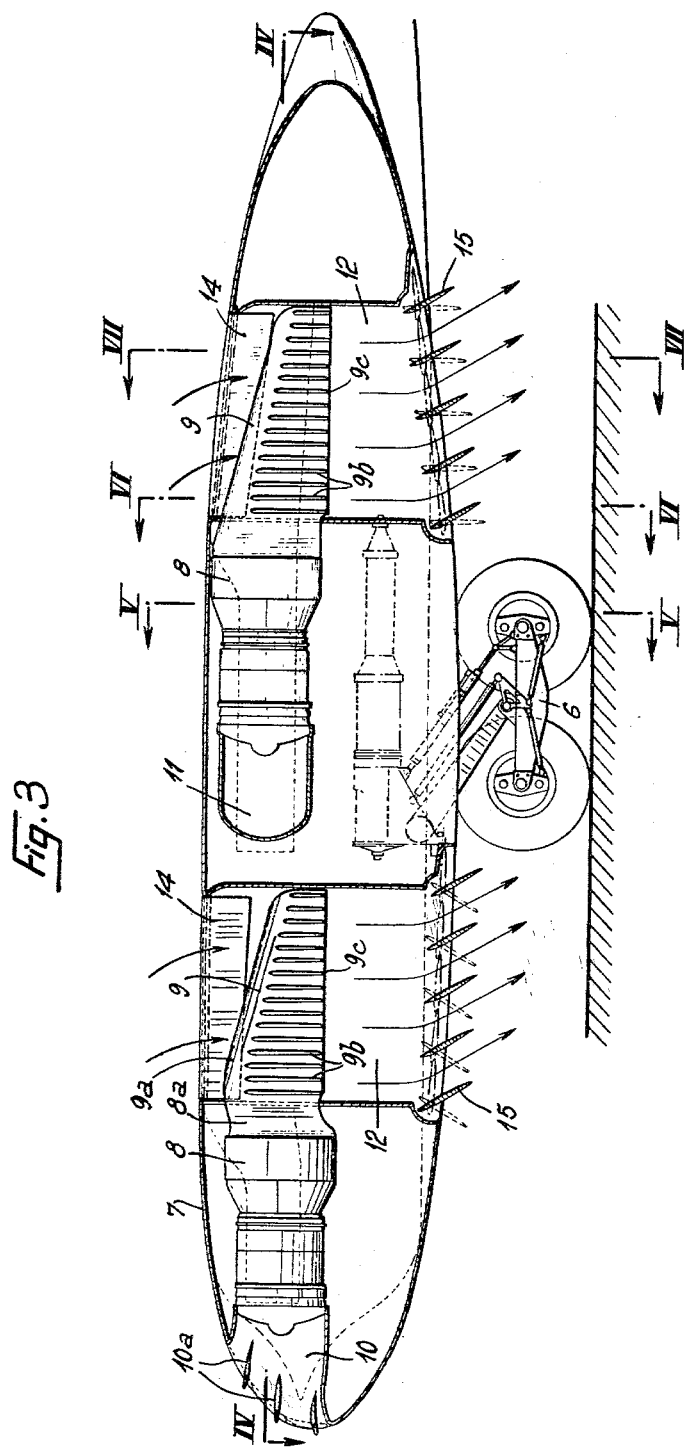
FIGURE 3 is a view on a larger scale, in longitudinal section on III—III of FIGURE 4, of a cowling of the type shown in the aircraft according to FIGURES 1 and 2.
Figure 4:
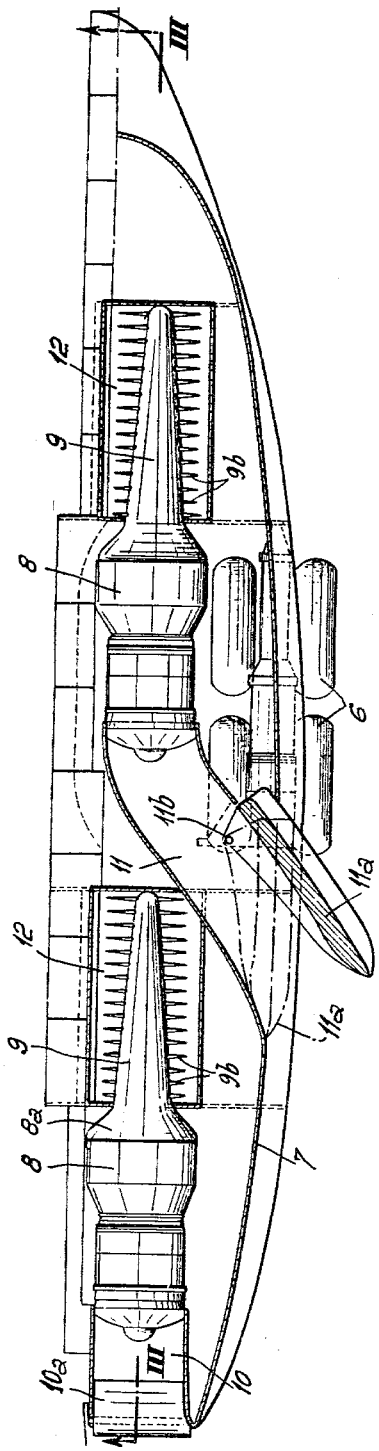
FIGURES 4 to 7 are respectively sectional views on IV—IV, V—V, VI—VI, and VII—VII of FIGURE 3.

In the form of embodiment illustrated in FIGURES 1 and 2, the aircraft 1 is a four-engined aircraft of the type which is said to have a "slipstream-assisted wing system," each of the wings 2 having two large-diameter propellers 3 co-operating with considerable high-lift devices 4.

In order to free the volume of the fuselage 5 to the maximum extent, the elements 6 of the landing gear have been mounted in lateral cowlings 7 arranged on either side of and below the said fuselage. The lifting jet engines 8 provided with air-inducting ejector devices 9 are combined with these cowlings, which are suitably arranged and enlarged. Four jet engines may thus be mounted, symmetrically with respect to the centre of gravity of the aircraft, with all the advantages mentioned hereinbefore.

These jet engines are used for take-off and landing, their thrust compensating for all or part of the weight of the aircraft. They are stopped when the aircraft is flying at normal cruising speeds.

Figure 5:
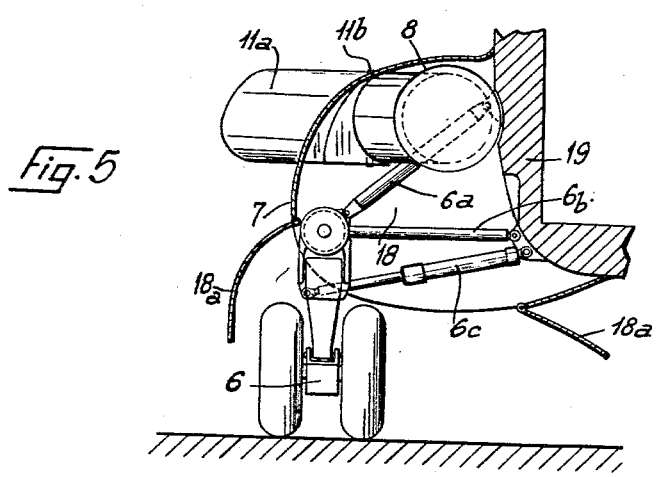

With reference now to FIGURES 3 to 7, it will be seen that the jet engines 8 are arranged in tandem horizontally in the cowling 7, rearwardly of an air intake 10 or 11. The air intake 10 of the forward jet engine comprises orientatable shutters 10a which are opened (full-line position) for take-off or landing and closed (dot-dash lines) during flight at cruising speeds in order to reestablish the aerodynamic outline of the cowling 7. The air intake 11 of the rear jet engine is orientated laterally, as FIGURE 5 shows best; it may be opened or closed by means of a shutter 11a which is mounted to be pivotable about a spindle 11b.

The jet engines may be given a more or less considerable inclination with respect to the longitudinal axis of the aircraft, which makes it possible to reduce the dimensions of the cowling 7 where necessary. They may be both directed forwardly as in the example illustrated, or else the rear jet engine may be orientated rearwardly, which makes it possible to bring the means for discharging the mixture of gas and air closer to one another.

In the present example, the ejector device 9 for the induction of air at each jet engine comprises a nozzle 9a which is arranged in prolongation of the discharge nozzle 8a of the jet engine and has an avoid shaped diminishing towards the free end. Connected to this nozzle 9a along transverse slots extending over the lower portion of the cross-section, are hollow vanes 9b of substantially trapezoidal shape which are closed at the sides and terminate at their lower portion in a slot 9c which is transverse relatively to the axis of the jet engine. The gases discharged by the jet engine issue in parallel sheets through the slots 9c, producing an ejector effect which draws in air between the vanes and mixes this air with the ejected gases.

Figure 6:
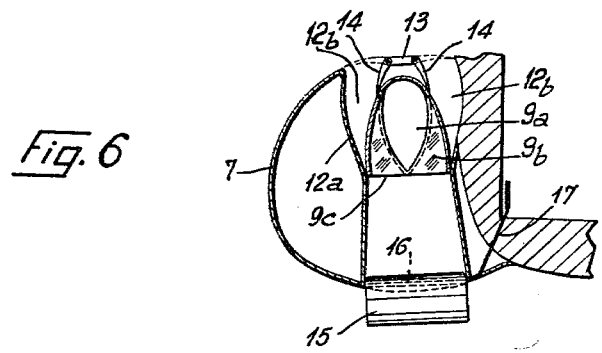
Figure 7:
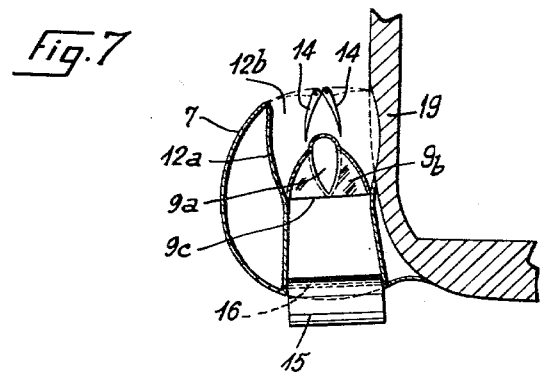

The ejector 9 is mounted in a vertical well 12 provided in the cowling 7. The lateral walls 12a of this well are given, as FIGURES 6 and 7 show, a convergent-divergent shape whose throat is situated level with the ejection slots 9c of the vanes 9b. The base of these vanes occupies almost the whole of the width of the throat where this well is narrowest.

Arranged in the centre of the upper aperture of the well 12 is a longitudinal member 13 on which shutters 14 are pivotally mounted whereby either the aperture can be closed when the aircraft is flying at cruising speeds (position shown in dot-dash lines in the drawings) or the said aperture can be unmasked to form with the nozzle 9a ducts 12b which guide the inducted air towards the spaces between the vanes 9b (position shown in full lines), when the ejector-equipped jet engines have to be used.

The lower aperture of the well 12 is provided with a series of blades 15 which are mounted to be pivotably movable on spindles 16 which are arranged transversely relatively to the direction of travel of the aircraft and which can be either closed during normal cruising flight or else opened when the ejector-equipped jet engines have to be used. A control 17 which is at the disposal of the pilot makes it possible to orientate the blades 15 to varying degrees of obliquity relatively to the vertical in order to assist in the control of the aircraft. Thus, for example, the blades 15 may be directed either obliquely rearwards during take-off (full-line position in FIGURE 3), or vertically during vertical ascent or descent, or obliquely forwardly (broken lines in the drawings) during landing.

The housing for the landing gear 6 (FIGURE 5) is provided in a compartment 18 of the cowling 7 situated below the rear jet engine, between the wells 12. The pivot 6a of the landing gear is carried by struts 6a, 6b fixed to the framework 19 of the fuselage. A jack 6c retracts and extends the landing gear. Flaps 18a permit the compartment 18 to be opened and closed.

In the variant shown in FIGURES 8 to 10, the cowling 7 combined with the ejector-equipped jet engines 8–9 has been constructed by enlarging and suitably arranging the cowling which connects the fuselage 5 to the wings 2, rearwardly of the lateral air intakes 20 for a central propulsion jet engine 21.

Four jet engines 8 provided with ejector devices 9 have been arranged symmetrically with respect to the centre of gravity G of the aircraft. In the example illustrated, two of the ejector-equipped jet engines are directed forwardly and the two others towards the rear. The air intakes 10 of these jet engines are provided with shutters 10a as in the form of embodiment shown in FIGURES 1 to 7. Similarly, the wells 12 of the cowlings 7 are provided at their upper portion with shutters 14a and at their lower portion with blades 15 whereby the continuity of the surface of these cowlings can be re-established during flight at cruising speeds.

An arrangement similar to the preceding arrangement will be found in FIGURES 11 to 13 also, but in this case in addition to the ejector devices 9 of the jet engines 8 there has been provided at each side of the aircraft, level with the centre of gravity G a supplementary ejector device 9' installed in a well 12' similar to the wells 12. The device 9' is connected by a lateral duct 22 to the propulsion jet engine 21 of the aircraft. Mobile shutters 23 make it possible to close either the entry to the ducts 22 or the discharge nozzle 24 of the jet engine 21, depending on whether the said jet engine is to be used for the propulsion or the lifting of the aircraft. The well 12' is also provided with shutters 14'a and blades 15' similar to those of the other wells.

It will be understood that the invention is not limited to the particular construction described above. In particular, the ejectors or ejecting the flow of discharge gases from the jet engine may be advantageously of the type described hereinbefore but of course any other type suitable for the problem presented in each particular case could also be used.

I claim:

1. Vertical take-off and landing aircraft comprising in combination a fuselage, a pair of cowlings adjacent to said fuselage and located externally thereof symmetrically with respect to the longitudinal vertical middle plane of said aircraft, said cowlings having mounted therein lifting jet engines with air ejector devices for the induction of air into the discharged gases from said engines, said cowlings being provided with air intake apertures for said lifting engines and air outlet apertures for the said discharged gas and induced air, said ejector devices each comprising a nozzle connected to the discharge end of a jet engine and having transverse hollow vanes which are closed at their sides and open at their lower ends to provide slots for the discharge of the engine gases.

2. Vertical take-off and landing aircraft according to claim 1, wherein the cowlings also accommodate the aircraft landing gear.

3. Vertical take-off and landing aircraft according to claim 1 wherein each cowling contains a pair of lifting jet engines with ejector devices disposed in tandem and also accommodates the aircraft landing gear elements between said pair of lifting jet engines.

4. Vertical take-off and landing aircraft according to claim 1 wherein the cowlings connect the wings to the fuselage of the aircraft.

5. A vertical take-off and landing aircraft according to claim 1 wherein said cowlings have, for each ejector device, a substantially vertical well formed with inlet and outlet apertures, and with means for guiding and controlling the flow of gas and air passing through the apertures and also for re-establishing the continuity of the outer surface of said cowlings as desired, said well having a convergently divergent shape with its narrowest section being located at the same level as the ejection orifices of said ejector device.

6. Vertical take-off and landing aircraft comprising in combination a fuselage, a pair of wings attached to said fuselage and provided with air intake apertures in their upper wall, a pair of cowlings adjacent to said fuselage, located externally thereof symmetrically with respect to the longitudinal vertical middle plane of said aircraft, partially extending within part of said wings and provided with gas discharging apertures; lifting jet engines with ejector devices for the induction of air into the discharged gases, mounted within said cowlings, the ejector devices of said engines having gas ejecting orifices; air intake ducts in said cowlings for connecting said engines with corresponding air intake apertures in said wings; said cowlings comprising, for each ejector device, a vertical well opening at one end into air intake apertures in said wing and at the other end, into gas discharging apertures of said cowlings, said well having a convergent-divergent shape and its narrowest cross-section being located substantially at the same level as the ejection orifices of said ejector device; and means for guiding and controlling the flow of gas and air passing through said apertures and also for reestablishing the continuity of the outer surface of said wings and cowlings as desired.

7. Vertical take-off and landing aircraft according to claim 6 wherein each cowling houses a pair of lifting jet engines disposed in tandem substantially parallel to said longitudinal middle plane, one of said engines being directed forwardly and the other rearwardly with respect to the aircraft.

8. Vertical take-off and landing aircraft according to claim 6 wherein said aircraft also comprises a propulsion jet engine, said cowlings each comprising a supplemental well provided with an ejector device, and means for selectively connecting the outlet of said propulsion engine to a propulsion nozzle and to the ejector device of said supplemental well as desired.

9. Vertical take-off and landing aircraft according to claim 8 wherein each cowling houses a pair of lifting jet engines disposed in tandem substantially parallel to said longitudinal middle plane, one of said lifting jet engines being directed forwardly and the other rearwardly with respect to said aircraft and said supplemental well being located between said wells corresponding to said lifting jet engines.

10. Vertical take-off and landing aircraft according to claim 8 wherein said propulsion jet engine is located within said fuselage.

References Cited by the Examiner
UNITED STATES PATENTS

| | | | |
|---|---|---|---|
| 2,483,027 | 9/49 | Van Zelm | 244—15 |
| 2,945,641 | 7/60 | Pribram | 244—15 XR |
| 3,012,738 | 12/61 | Bertin | 244—12 |
| 3,031,155 | 4/62 | Kerry | 244—12 |
| 3,085,770 | 4/63 | Sutton | 244—23 |

FOREIGN PATENTS 1,199,711  6/59  France.

FERGUS S. MIDDLETON, *Primary Examiner.*
RALPH D. BLAKESLEE, MILTON BUCHLER,
*Examiners.*